United States Patent
Beutter et al.

(10) Patent No.: US 6,533,721 B1
(45) Date of Patent: Mar. 18, 2003

(54) ENDOSCOPIC CAMERA SYSTEM WITH AUTOMATIC NON-MECHANICAL FOCUS

(75) Inventors: Richard A. Beutter, San Jose, CA (US); William H. L. Chang, Milpitas, CA (US)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 09/917,473

(22) Filed: Jul. 27, 2001

(51) Int. Cl.[7] ................................................ A61B 1/04
(52) U.S. Cl. ...................................... 600/167; 600/109
(58) Field of Search ................................ 600/109, 160, 600/167, 168; 348/353, 345; 250/201.7, 201.2, 201.4; 396/102, 130

(56) References Cited

U.S. PATENT DOCUMENTS

| | | | |
|---|---|---|---|
| 3,924,156 A | * 12/1975 | Doran et al. | 315/382 |
| 4,600,832 A | * 7/1986 | Grund | 250/201.7 |
| 5,335,662 A | * 8/1994 | Kimura et al. | 600/137 |
| 6,224,542 B1 | * 5/2001 | Chang et al. | 600/109 |
| 6,343,144 B2 | * 1/2002 | Uchida | 382/162 |

* cited by examiner

Primary Examiner—John P. Leubecker
(74) Attorney, Agent, or Firm—Blakely, Sokoloff, Taylor & Zafman LLP; Jordan M. Becker

(57) ABSTRACT

An endoscopic camera system includes apparent focusing capability to automatically and non-mechanically apparently focus images of internal features of a body during an endoscopic procedure. The system includes a scope for insertion into the body, a camera head coupled with the scope, and a camera control unit coupled with the camera head. Video image data of internal features of the body are acquired through the scope by the camera head and transmitted to the camera control unit, which generates video images for display on a monitor. The camera control unit includes an auto-focusing process for digitally focusing the video images in real-time.

33 Claims, 6 Drawing Sheets

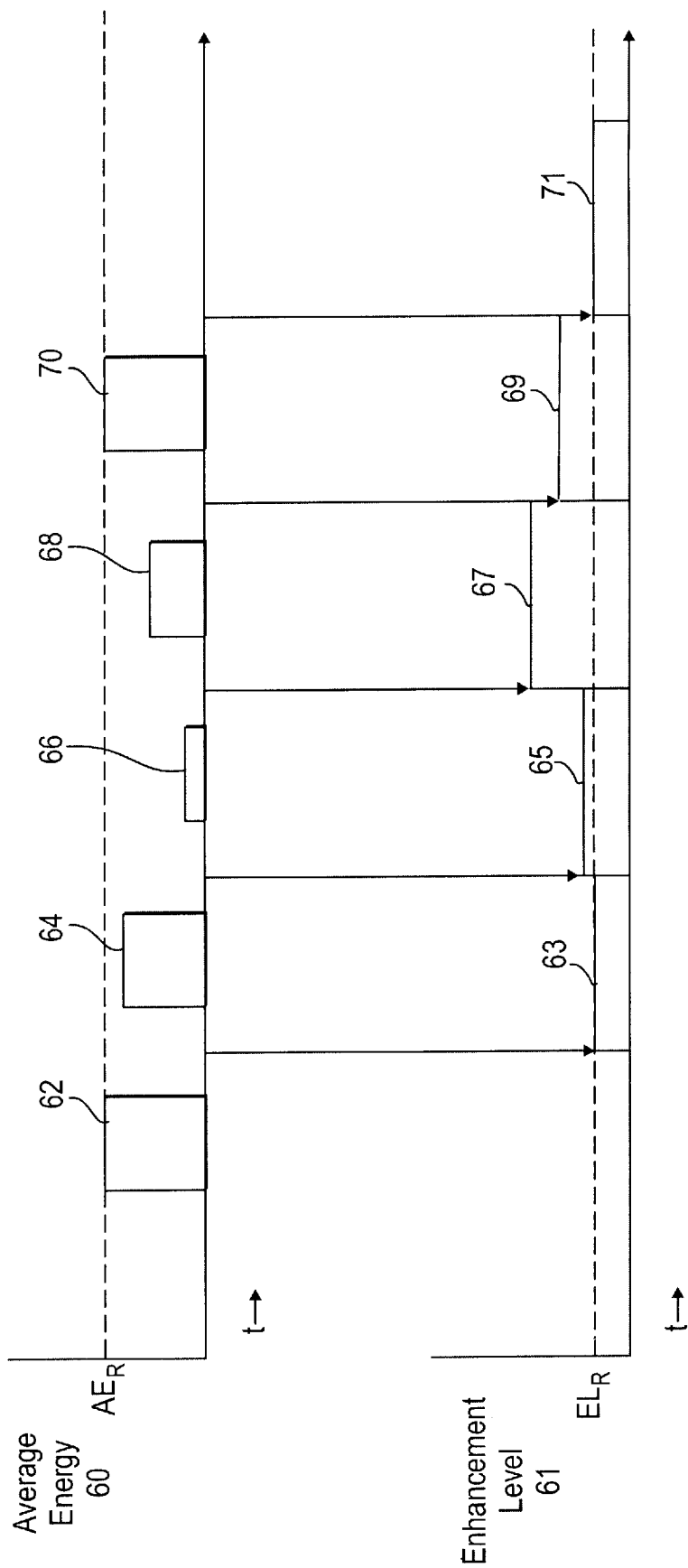

ENDOSCOPIC CAMERA SYSTEM WITH AUTOMATIC NON-MECHANICAL FOCUS

FIELD OF THE INVENTION

The present invention pertains to the field of medical devices. More particularly, the present invention relates to image processing in endoscopic camera systems.

BACKGROUND OF THE INVENTION

Endoscopy is a medical field that allows the acquisition of high-quality video A images of internal features of a human body, without the need for invasive surgery. A basic tool of endoscopy is an endoscopic camera system, which includes an endoscope ("scope") that is inserted into the body of a patient. Some endoscopic procedures involve the use of a flexible scope, as in the field of gastroenterology, for example. Other procedures, such as arthroscopy or laparoscopy, involve the use of a rigid scope. The scope is normally connected to a camera head that includes electronics for acquiring video image data through the scope.

The connected scope and camera head may be held and manipulated during endoscopic surgery by a human surgical assistant or by a holding tool, such as a robotic positioning system. The scope has optical properties that allow it to introduce light into the body of the patient and to transmit light from the body cavity to the camera head. A high intensity light source may be coupled to the scope by a fiber optic cable to introduce light into the body. The camera head is coupled through a flexible transmission line to a camera control unit, which is often mounted on a mobile cart. The control unit processes video data provided by the camera head to generate images, which are displayed on a video monitor. The control unit may also be coupled to various peripheral devices, such as a printer and a videocassette recorder (VCR).

During endoscopic surgery, the person who is holding the scope may not be able to hold the scope perfectly still, especially when fatigue sets in. This may cause the displayed video image to fall out of focus. Hence, the video image normally must be refocused frequently during surgery. Also, many endoscopic system installations make use of several different types of scopes, old and new, from various companies. The combinations of these systems cannot necessarily provide optimal depth of focus for all surgeries. In some endoscopic camera systems, focusing is done by manually adjusting to the optics between the scope and the camera head. This approach has disadvantages, however. For example, manual focusing consumes valuable time during surgery. Further, the refocusing process may involve several trial-and-error steps as the scope holder makes corrections in response to verbal feedback from the surgeon.

Some camera systems provide the capability to automatically focus the image. However, such systems still rely upon mechanical focusing, that is, adjusting the physical configuration of the optics within the scope and/or its connection to the camera head, although the adjustment is done under electric control. These systems take a measurable amount of time to adjust when the image becomes unfocused thus introducing a focusing lag. Because of this focusing lag, the adjustment is prone to a problem known as "overshoot". Overshoot occurs when, during the time that the system is refocusing, the camera system has already fallen out of focus at the new position that the camera is attempting to adjust to. So, by the time that the system has moved to the new position, the system has to immediately begin to correct the focus, because the image would not be focused at this new position. To the surgeon, the image simply seems to continually move in and out of focus. Therefore, even these systems consume precious time to adjust and are subject to a certain amount of trial-and-error in focusing.

Another problem with some camera systems is that the focusing operation includes changing the size of the aperture in the camera. When the size of the aperture is decreased, the resolution of the image tends to be decreased. Also, decreasing the size of the aperture allows less light to go through the aperture. Less light going through the aperture causes the video image to become dimmer, making it harder to see detail in the image. Thus, a focusing mechanism is desired that keeps the image in focus without sacrificing brightness or the resolution of the video image.

Yet another problem with mechanically focusing endoscopic camera systems is the occurrence of failure. In general, moving parts are more likely to break down than electronic components. Because the mechanical systems must use moving parts in order to adjust the optical components, they are more likely to break down. This is especially true with endoscopic cameras and accessories that undergo harsh sterilization environments and rough handling. Such failures are expensive and can have serious consequences if they occur during surgery.

SUMMARY OF THE INVENTION

An endoscopic camera system includes the capability to receive image data from an endoscopic camera and to process the image data to generate images, including the capability to automatically and non-mechanically focus images. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 is an illustrative graph of an average energy of an image and a corresponding enhancement level set by the process of FIG. 5.

DETAILED DESCRIPTION

Figure 1:
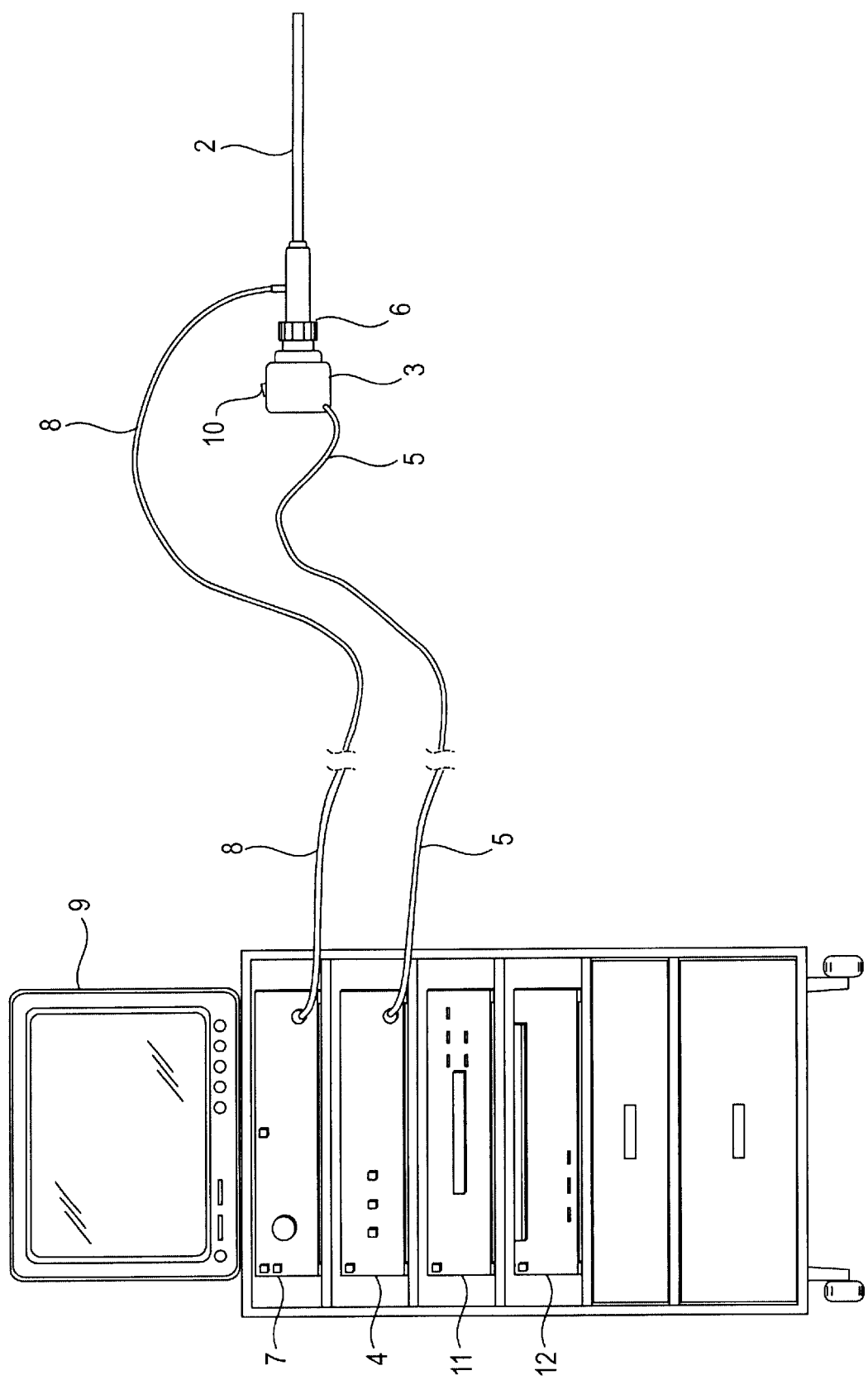
FIG. 1 illustrates an endoscopic camera system.

Other endoscopic camera systems rely either on manual adjustment of optical components or automatic mechanical adjustment of optical components. Manual adjustment of optical components is error prone and time consuming. Automatic mechanical adjustment is subject to the problem of overshoot and, to a lesser degree than manual adjustment, error prone and time consuming. An endoscopic camera system having automatic digital focus is described. As will be described in greater detail below, the endoscopic camera system includes a camera control unit having an auto-focus unit for non-mechanically focusing video images of internal features of the body in real-time. The focus feature avoids the need to adjust the optics of the scope and/or camera either manually or mechanically. Because the focusing is done electronically, no controls need to be repeatedly adjusted during surgery, thus avoiding waste of surgery time in adjusting controls for focusing.

Focused images generally are characterized by high contrast and distinct edge definition, whereas unfocused images are characterized by poor edge definition. Altering the enhancement level of a video image can be used to increase edge definition in the image. Therefore, for a camera system that handles a relatively small range of distances over which it must be focused, such as an endoscopic camera system, manipulation of the enhancement level can provide an apparent focusing effect. Generally speaking, the more distinct the edge definition is in a video image, the higher the average energy value of that image will be. Likewise, images that are unfocused are blurry and tend to have lower edge definitions and therefore, a lower average energy value than images that are focused. Therefore, the average energy of a video image can be monitored and maintained by adjusting the enhancement level of the image appropriately, so as to maintain high edge definition in the image. The result is an image which appears to remain in focus for relatively small movements of the camera.

Changing the edge-enhancement level changes the luminance levels at the edges of objects in the video image, which, in turn, changes the average energy value of the image. Although, the actual degree of focus of the video image remains unchanged when changing the enhancement level, the increased edge definition obtained by adjusting the enhancement level makes the video image appear to remain focused.

Note, however, that this technique generally would not be effective in general-purpose camera systems which must focus over a much larger range of distances than endoscopic camera systems. The circuitry in most camera control units today has a maximum video enhancement. This means that if an image must be focused by a large distance, a very large change in the enhancement level would be necessary to provide an apparent focus effect. However, because most camera control units have a maximum video enhancement much smaller than the enhancement level required to provide an apparent focusing effect for large distances, the apparent focusing effect provided by this technique cannot be realized.

A second limitation is that the amplification provided by changing the enhancement value also amplifies the inherent noise in the video image signal. As the enhancement value gets very large, the image tends to become noisy. Thus, because over-enhancing introduces too much noise into the image to provide a coherent focus, the process of modifying the enhancement level to provide an apparent focusing effect generally would not be effective in general-purpose video cameras that require the ability to focus over much larger distances. Yet, because endoscopic camera systems only need to focus over a relatively small range of distances (generally no greater than the depth of a human body cavity), modifying the enhancement levels is effective in providing an apparent focusing effect, without the problems associated with mechanical adjustment of the degree of focus.

FIG. 1 illustrates an endoscopic camera system in which the present invention may be implemented. The illustrated camera system includes a rigid scope 2 of the type that is commonly used for laparoscopy or arthroscopy. The scope 2 is coupled to a camera head 3 by a coupler 6. The camera head 3 includes well-known circuitry, such as charge-coupled devices (CCDs), for acquiring color video image data of internal features of the body through a system of lenses within the scope 2. Light is provided to the scope 2 by a flexible light source 7 through an appropriate flexible light conduit 8, such as a fiber optic cable. The camera head 3 is coupled to a camera control unit (CCU) 4 by a flexible transmission line 5. Operation of the camera system is controlled, in part, from CCU 4. Transmission line 5 conveys video image data from the camera head 3 to the CCU 4 and conveys various control signals bi-directionally between the camera head 3 and the CCU 4. It is assumed, for purposes of this description, that image data output by the camera head 3 onto transmission line 5 are in an analog format, such as National Television Standards Committee (NTSC) format. However, in alternative embodiments, the image data output by the camera head 3 may be digital, in which case transmission line 5 may be an IEEE standard 1394 interface, Universal Serial Bus (USB), or another type of high-speed digital interface.

A button or other similar manual control 10 on the camera head 3 allows a user to set the desired focus level and/or control other functions of the camera system. Also coupled to the CCU 4 are a videocassette recorder (VCR) 11, a printer 12, and, optionally, other devices not shown, as desired. Video image data acquired by camera head 3 and processed by CCU 4 is converted to images, which can be displayed on monitor 9, recorded in VCR 11, and/or used to generate static images, hard copies of which can be produced by printer 12.

Figure 2:
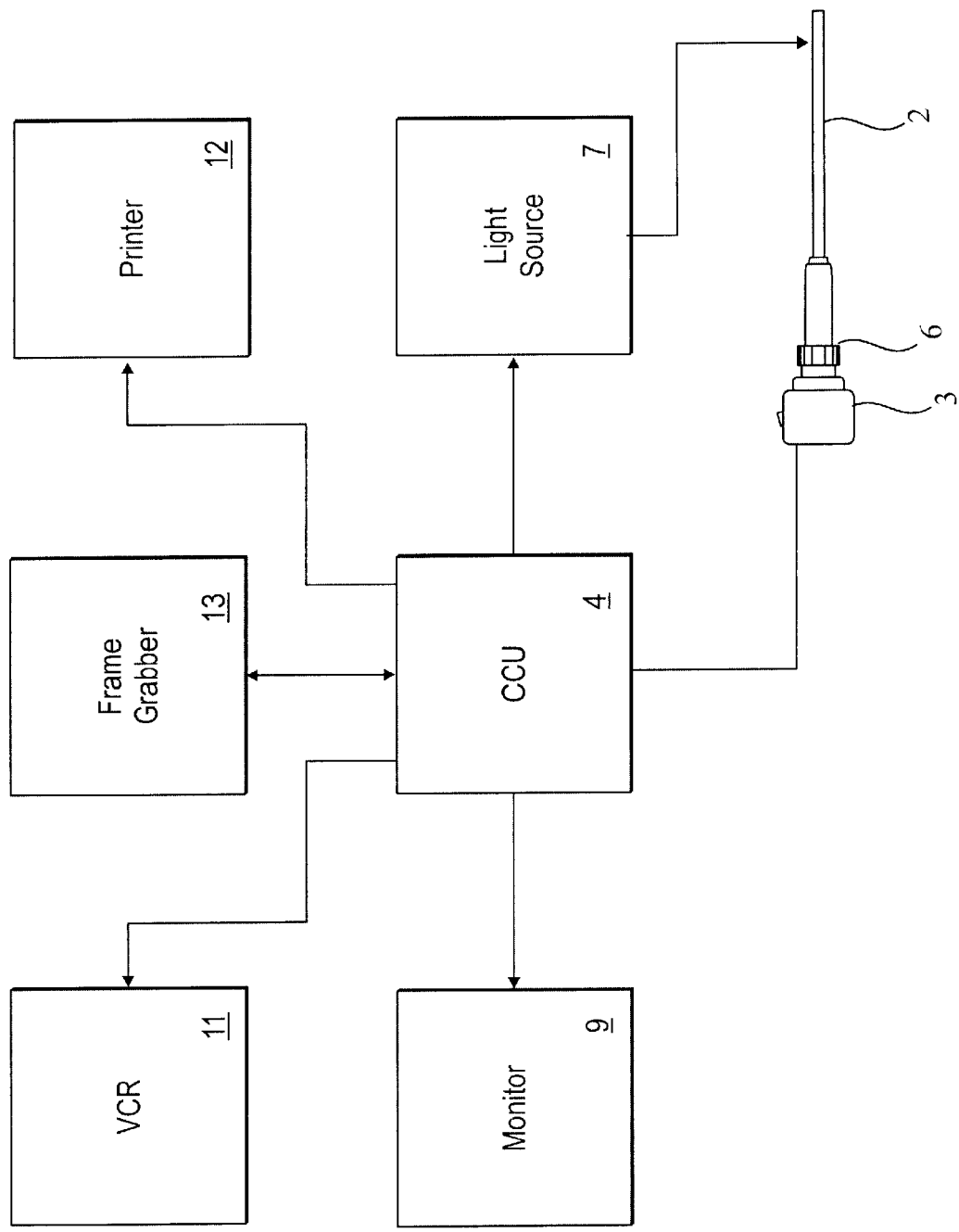
FIG. 2 is a block diagram of the endoscopic camera system of FIG. 1.

FIG. 2 is a block diagram of the endoscopic camera system of FIG. 1, according to one embodiment. The CCU 4 includes user input controls for adjusting various settings of the camera system, such as shutter, gain, and white balance. The camera head 3 is coupled to the CCU 4 so as to allow communication of both image data and control signals between CCU 4 and camera head 3. For this invention, a camera head that uses image detectors (for example, charge coupled-devices (CCDs)) with a relatively low signal-to-noise ratio is necessary. The commercially available Sony EX-View is an example of a CCD which is believed to be suitable. Also coupled to the CCU 4 are the light source 7, monitor 9, VCR 11, printer 12, and frame grabber 13. Frame grabber 13 may be used to capture and save individual frames of video data acquired from camera head 3, which may then be printed on printer 12.

Note that numerous variations upon the embodiment in FIG. 2 may be implemented as alternative embodiments. In one alternative embodiment, for example, the frame grabber 13 is capable of controlling other components in the system (e.g., the printer 13, VCR 11 and/or monitor 9) in response to the CCU 4; this embodiment eliminates the need for some of the illustrated connections between the CCU 4 and these other components. Also, as indicated above, other components may be added to or deleted from the system, if appropriate.

Figure 3:
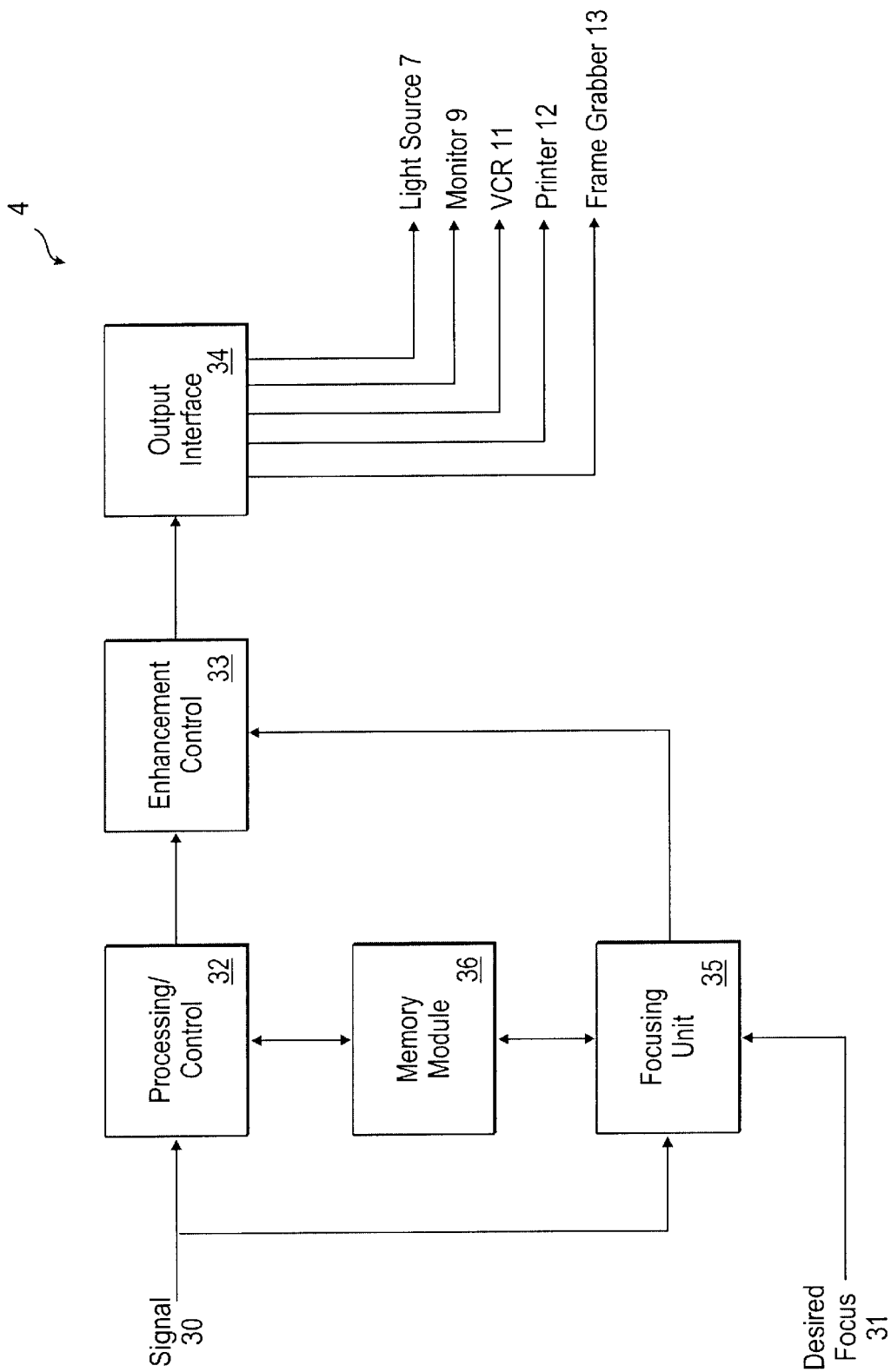
FIG. 3 is a block diagram of the camera control unit (CCU) of the endoscopic camera system.

FIG. 3 is a block diagram of the CCU 4, according to one embodiment. In the illustrated embodiment, the CCU 4 receives two inputs, an image signal 30 and a desired focus input 31, and includes a processing/control unit 32, an enhancement control unit 33, an output interface 34, a focusing program 35, and a memory module 36. The desired focus input 31 may originate from a control on the camera head, such as control 10 (see FIG. 1).

Processing/control unit 32 controls the overall operation of the CCU 4 and performs signal processing, including functions commonly used in generating displayable video images. Accordingly, processing/control unit 32 may be, or may include, one or more general- or special-purpose microprocessors, digital signal processors (DSPs), application specific integrated circuits (ASICs), programmable logic devices (PLDs), field programmable gate arrays (FPGAs), or other appropriate devices or combination of such devices. Processing/Control unit 32 may also include devices appropriate for buffering, amplification, and signal conditioning, as will be recognized by those skilled in the art.

The memory module 36 may include random access memory ("RAM"), nonvolatile memory, or other appropriate devices or combination of such devices. Software instructions executable by processing/control unit 32 for performing various functions of the CCU 4 may be stored in the memory module 36. Additionally, image data used by focusing unit 35 also may be stored at various stages of processing in the memory module 36.

In the illustrated embodiment, processing/control unit 32 generates various outputs directed to the light source 7, monitor 9, VCR 11, printer 12, or frame grabber 13 via the output interface 34, which performs any appropriate buffering or signal conditioning.

When the desired focus input 31 is set, focusing unit 35 begins to automatically and non-mechanically adjust the enhancement level to provide an apparent focusing effect as described above and as further described below. For purposes of this description, "non-mechanical" focusing means focusing that does not require physical manipulation of the optical elements of the camera system. In alternate embodiments, this functionality can be implemented within processing/control unit 32 and/or memory 36. For examples, this functionality could be implemented by processing/control unit 32 executing instructions stored in memory 36, or by hardwired circuitry in processing/control unit 32. The focusing unit 35 generally includes circuitry for operating on images generated by processing/control unit 32 in real-time (as the image data are acquired) using data acquired from the signal 30. The focusing unit 35 may be, or may include, a general- or special-purpose microprocessor, ASIC, PLD, FPGA, or other appropriate device or combination of such devices.

Thus, the digital auto-focus feature of the present invention avoids the need for mechanical adjustment of the optical properties of the scope or camera. The focus level can be maintained without manually adjusting any controls or physically changing the optics of the camera system, thus avoiding waste of valuable surgery time.

Figure 4:
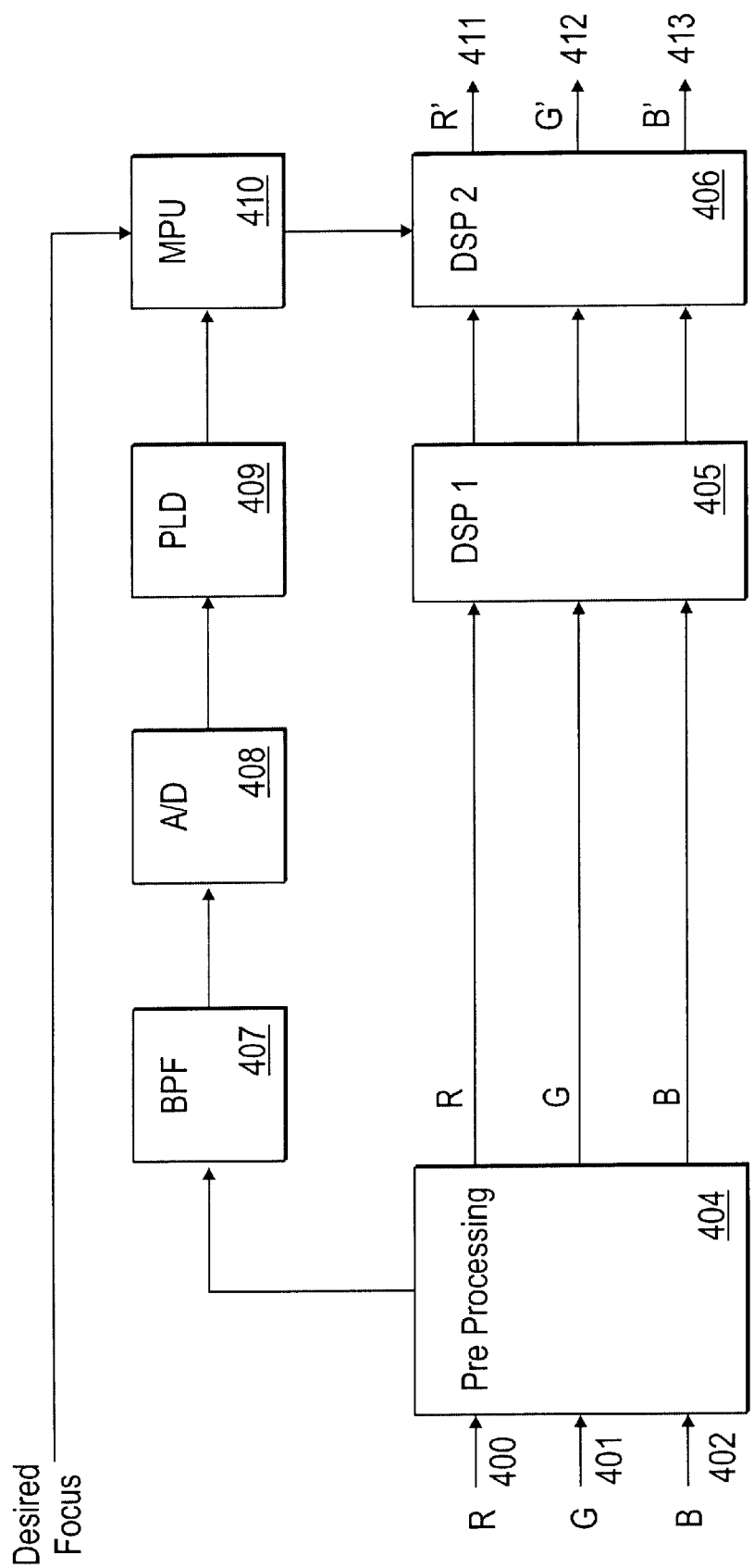
FIG. 4 shows one implementation of the CCU of the endoscopic camera system.

FIG. 4 shows one implementation of the camera control unit 4 of FIG. 3. The illustrated implementation includes a pre-processing unit 404, a first DSP 405, a second DSP 406, a bandpass filter ("BPF") 407, an analog-to-digital converter ("A/D converter") 408, a PLD 409, and a microcontroller processing unit ("MPU") 410. The camera control unit 4 receives a video signal from the video camera head 3 which includes constituent red ("R"), green ("G"), and blue ("B") signals 400, 401, 402. The camera control unit outputs processed red ("R'"), green ("G'"), and blue ("B'") signals 411, 412, and 413.

The pre-processing unit 404 performs two functions. First, it performs conventional amplification, signal conditioning, and analog to digital conversion to the RGB inputs 400, 401, and 402 necessary for the DSPs 405 and 406. Second, it sums the RGB inputs 400, 401, and 402 into one signal and performs any amplification or signal conditioning necessary for the BPF 409.

The first DSP 405 performs functions commonly used in generating displayable video images and could comprise multiple DSPs coupled together in series-one DSP for each commonly used function. The second DSP 406 adjusts the enhancement of the RGB signals 400, 401, and 402 and is controlled by the MPU 410.

BPF 407 is a device well known in the art and is optimally tuned to pass frequencies at or close to 1.8 MHz. In the illustrated embodiment, the BPF 407 is an analog device. A/D converter 408 converts the analog signal into a digital signal. In alternate embodiments, the BPF 407 may comprise a digital BPF instead of an analog BPF and the order of the A/D converter 408 and BPF 407 may be reversed.

PLD 409 is configured to determine a maximum high-frequency energy content of the signal. It operates by integrating high-frequency data received from the combination of the BPF 407 and the A/D converter 408 and integrating the high-frequency data over each field (odd or even) of the video image.

MPU 410 generally contains or communicates with a memory module. The MPU 410 is configured to receive the integrated high-frequency energy data from the PLD 409, receive the desired focus signal 403, and control the second DSP 406 for purposes of adjusting the enhancement level. When the desired focus signal 403 is enabled, the MPU memorizes the current high-frequency energy data received from the PLD as Dset and sets the current enhancement level as the reference enhancement level. As subsequent high-frequency energy data (Dn) is received from the PLD, the MPU compares Dn with Dset. If Dn is less than Dset, the enhancement level is raised through communication with the second DSP 406. If Dn is greater than or equal to Dset, the enhancement level remains at the reference enhancement level.

Figure 5:
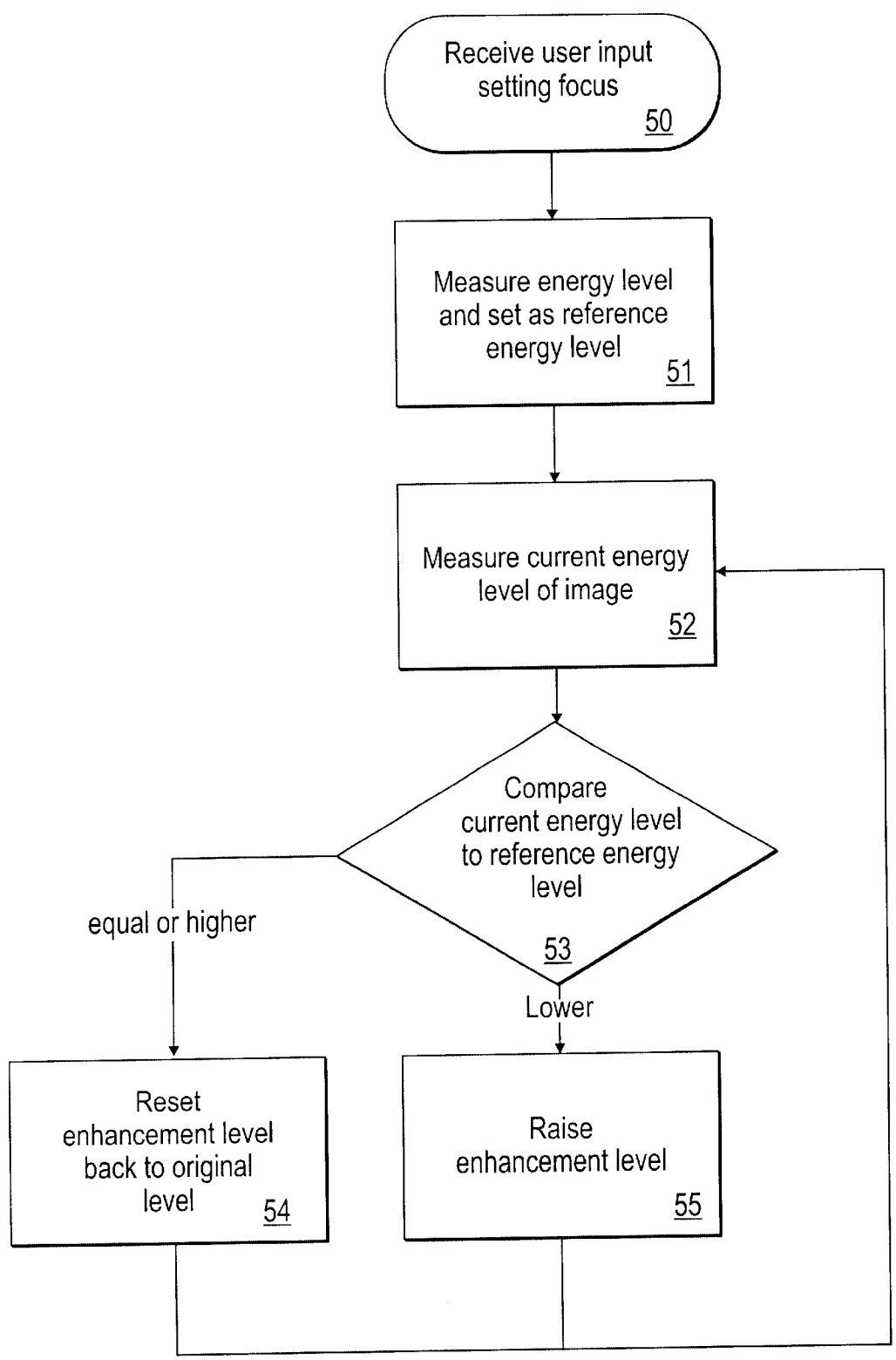
FIG. 5 is a flowchart of a process employed by the focusing program of the camera control unit of FIG. 3.

FIG. 5 is a flowchart of the auto-focusing process, according to one embodiment. During operation of the camera system, the user first focuses the image, either manually or by activating an electronic focusing mechanism. The process begins at block 50 by the activation of a user control signifying that the video image is properly focused. The control may be, for example, a button on the camera head.

In response to activation of the control, the average energy value of the image is calculated at block 51 as a reference energy level. A preferred method of calculating the average energy value is to send raw Red-Green-Blue video data through a bandpass filter tuned to 1.8 Mhz and then to integrate the resulting high-frequency data over each field.

As the operation progresses and the image falls out of focus due to, for example, movement of the scope or the object being viewed, the average energy value of the current video image, as calculated at block 52, will deviate from the reference energy level. If the compare block 53 finds that the average energy value is higher than or equal to the reference energy level, block 54 is utilized to reset the enhancement level of the video image. If the compare block 53 finds that the average energy value is lower than the reference energy level, block 55 will be utilized to raise the enhancement of the video image an appropriate amount so as to maintain the average energy value at the reference level, which provides an apparent focusing effect to the user. In some embodiments of the invention, the compare block may cause no change in the enhancement level if the average energy value is within a pre-set tolerance of the desired level.

FIG. 6 is an illustrative graph showing an example of the change in an average energy of an image 60 and a corresponding enhancement level 61, which is set by the process of FIG. 5, over time ("t"). Average Energy 62 is the top measurement on graph 60. The average energy level will be set as the reference energy level, $AE_R$. Hence, the enhancement level 63 is the reference enhancement level, $EL_R$. Next, average energy 64 is slightly lower than the reference energy level, thus the enhancement level must be raised by a small amount, as is seen by the small increase in enhancement from enhancement 63 to enhancement 65. The next average energy, average energy 66, is substantially below the reference energy level; consequently, there must be a significant increase in the enhancement level. This significant increase is represented by enhancement 67. Following this, average energy 68 is next. Average energy 68, while higher than average energy 66, is still well below the reference energy level. Therefore, the enhancement level must be adjusted to a level between enhancement 67 and the reference enhancement level 63. Thus, as can be seen, enhancement level 69 is higher than the reference enhancement level, while lower than enhancement level 67. Finally, the last average energy on this graph is average energy 70. Average energy 70 is exactly equal to the reference energy 62 and consequently, enhancement level 71 is set equal to the reference enhancement level 63.

What is claimed is:

1. A method comprising:
   receiving video data from an endoscopic camera;
   generating a video image based on the video data; and
   repeatedly adjusting a user-perceived degree of focus of the video image automatically and non-mechanically as necessary to maintain a predetermined setting by automatically adjusting an enhancement level of the video image.

2. A method as recited in claim 1, wherein the predetermined setting corresponds to a user-specified degree of focus.

3. A method as recited in claim 2, where the repeatedly adjusting a user-perceived degree of focus of the video image comprises:
   receiving the user-specified degree of focus;
   converting the user-specified degree of focus to an equivalent average energy value; and
   repeatedly:
      measuring the average energy value of the video image;
      raising an enhancement level of the video image if the average energy value of the video image is lower than the average energy value of the user-specified degree of focus; and
      re-setting the enhancement level of the video image if the average energy value of the video image is higher than or equal to the average energy value of the user-specified degree of focus.

4. A method as recited in claim 1, further comprising outputting the video image to a display device.

5. A method as recited in claim 1, wherein the repeatedly adjusting of the user-perceived degree of focus of the video image automatically and non-mechanically comprises maintaining the user-perceived degree of focus of the video image within a pre-set tolerance of the predetermined setting.

6. A method as recited in claim 1, wherein the method is configured for use in focusing images of objects within a small volume.

7. A method comprising:
   receiving video data from an endoscopic camera;
   generating a video image based on the video data; and
   maintaining a user-perceived degree of focus of the video image by
   automatically adjusting an enhancement level of the video image.

8. A method as recited in claim 7, wherein the automatically adjusting the enhancement level of the video image comprises automatically adjusting the enhancement level of the video image to maintain a substantially constant energy of the video image.

9. A method as recited in claim 8, further comprising, prior to the maintaining, computing the energy of the video image in response to a user input indicating the video image is focused.

10. A method comprising:
    receiving video data from an endoscopic camera;
    generating a video image based on the video data;
    receiving a user input indicating that the video image is focused;
    computing an energy of the video image in response to the user input; and
    automatically adjusting an enhancement level of the video image to maintain the energy of the video image.

11. A method as recited in claim 10, wherein the automatically adjusting the enhancement level of the video image is such that a degree of focus of the video image, as perceived by the user, remains substantially constant.

12. A camera control unit configured to:
    receive video image data from an endoscopic camera;
    generate a video image based on the video data; and
    maintain a user-perceived degree of focus of a video image automatically as necessary to maintain a predetermined setting by automatically and non-mechanically adjusting an enhancement level of the video image.

13. A camera control unit as recited in claim 12, wherein the predetermined setting corresponds to a user-specified degree of focus.

14. A camera control unit as recited in claim 12, further configured to output the video image to a display device.

15. A camera control unit as recited in claim 12, wherein the maintaining of the user-perceived degree of focus of the video image automatically and non-mechanically comprises maintaining the user-perceived degree of focus of the video image within a pre-set tolerance of the predetermined setting.

16. A camera control unit as recited in claim 12, where the maintaining of the user-perceived degree of focus of the video image automatically and non-mechanically is configured to repeatedly measure an average energy value of the video image and repeatedly adjust the enhancement level of the video image automatically and non-mechanically as necessary to maintain a desired average energy value substantially equal to the average energy value of the predetermined setting.

17. A camera control unit as recited in claim 12, wherein the camera control unit is configured for use in focusing a video image of a narrow volume.

18. A camera control unit comprising:
    a processor;
    an output module to output a second video image after processing a user input and a first video image captured by a camera; and a memory, coupled to the processor, which stores data representing a current degree of focus and a desired degree of focus and instructions to perform an auto-focusing process without physically adjusting optics of the camera.

19. A camera control unit as recited in claim 18, wherein the camera control unit is configured for use in focusing images of objects within a small volume.

20. A camera control unit comprising:

means for receiving video image data from an endoscopic camera;

means for processing the video image data received from an endoscopic camera to generate a video image; and means for repeatedly adjusting a user-perceived degree of focus of a video image automatically and non-mechanically as necessary to maintain a desired degree of focus by automatically and non-mechanically adjusting an enhancement level of the video image.

21. A camera control unit as recited in claim 20, further comprising means for outputting the video image to a display device.

22. A camera control unit as recited in claim 20, wherein the means for repeatedly adjusting the user-perceived degree of focus of the video image automatically and non-mechanically comprises means for maintaining the user-perceived degree of focus of the video image within a pre-set tolerance of the desired degree of focus.

23. A camera control unit as recited in claim 20, wherein the means for repeatedly adjusting the user-perceived degree of focus of the video image automatically and non-mechanically comprises means for repeatedly measuring an average energy value of the video image and repeatedly adjust the enhancement level of the video image automatically and non-mechanically as necessary to maintain a desired average energy value substantially equal to the average energy value of the desired degree of focus.

24. A camera control unit as recited in claim 23, wherein the means for repeatedly adjusting the enhancement level of the video image automatically and non-mechanically comprises means for bringing the average energy value of the video image within a pre-set tolerance of the average energy value of the desired average energy value.

25. An endoscopic camera system comprising:

an endoscope;

a video camera head to couple with the endoscope; and a camera control unit to couple with the video camera head and configured to process video image data to generate a video image, the camera control unit configured to output video image data to a display device, the camera control unit configured to process the video image data to apparently focus the video image automatically and non-mechanically to bring a user-perceived degree of focus of the video image to a user defined desired degree of focus.

26. An endoscopic camera system as recited in claim 25, where the camera control unit is configured to change the user-perceived focus of the video image automatically and non-mechanically to bring the user-perceived degree of focus of the video image within a pre-set tolerance of the user defined desired degree of focus.

27. An endoscopic camera system comprising:

a endoscope;

a camera head coupled with the endoscope;

a camera control unit coupled with the video camera head and configured to process video image data to generate a video image, the camera control unit configured to output the video image data to a display device, the camera control unit configured to process the video image data to change an enhancement level of the video image automatically and non-mechanically to make an average energy value of the video image equal a user defined desired average energy value; and a display device coupled with the camera control unit.

28. An endoscopic camera system as recited in claim 27, where the camera control unit is configured to change the enhancement value of the video image automatically and non-mechanically to bring the average energy value of the video image within a pre-set tolerance of the user defined desired average energy value.

29. An endoscopic camera system comprising:

an endoscope for insertion into a body;

a light source optically coupled with the endoscope;

a video camera head coupled with the scope, the video camera head including video circuitry for acquiring video image data of internal features of the body;

a transmission line coupled with the camera head;

a camera control unit coupled with the camera head and configured to process the video image data to generate video images, the camera control unit configured to output video image data to a display device, the camera control unit configured to process the video image data to apparently focus the video image automatically and non-mechanically to a user defined desired degree of focus; and a display device coupled with the camera control unit for displaying the video images in real time.

30. An endoscopic camera system as recited in claim 29, where the camera control unit is configured to change the user-perceived focus of the video image automatically and non-mechanically to bring the user-perceived degree of focus of the video image within a pre-set tolerance of the user defined desired degree of focus.

31. An endoscopic camera system as recited in claim 30, further comprising:

a video recording device coupled with the camera control unit and further coupled with the display device.

32. A method comprising:

receiving video image data of internal features of a body from an endoscopic camera;

generating a video image for display by a display device based on the video image data;

receiving a user input indicative of a desired degree of focus of the video image; and automatically and non-mechanically maintaining a user-perceived degree of focus of the video image based on the desired degree of focus.

33. A method as recited in claim 32, where the automatically and non-mechanically maintaining the user-perceived degree of focus comprises: calculating an average energy value of the video image at the desired degree of focus; and repeatedly adjusting an enhancement level of the video image as necessary to maintain the energy value.

* * * * *